United States Patent [19]

Duncan et al.

[11] 3,765,915

[45] Oct. 16, 1973

[54] BETA-ALUMINA POLYCRYSTALLINE CERAMICS

[75] Inventors: James H. Duncan; Brian K. Hick, both of London, England

[73] Assignee: British Railway Board, London, England

[22] Filed: Jan. 27, 1972

[21] Appl. No.: 221,386

[30] Foreign Application Priority Data
Feb. 3, 1971 Great Britain...................... 3,815/71

[52] U.S. Cl. ................................ 106/73.4, 136/153
[51] Int. Cl... C04b 35/10, H01m 11/00, B01k 3/12
[58] Field of Search.......................... 106/39, 62, 65; 136/153

[56] References Cited
UNITED STATES PATENTS

| 3,535,163 | 10/1970 | Dziecivch et al. .............. 136/153 X |
| 3,475,225 | 10/1969 | Tennenhouse......................... 106/65 |
| 3,625,773 | 12/1971 | Charles.................................. 106/65 |

*Primary Examiner*—Helen M. McCarthy
*Attorney*—Elliott I. Pollock et al.

[57] ABSTRACT

A method of preparing a Beta-alumina polycrystalline ceramic comprises firing a mix consisting essentially of by weight:
$Li_2O$ – 0.7 – 1.5%
$Na_2O$ – 8.3 – 8.9%
$MgO$ – 0.5 – 2.0%
$Al_2O_3$ – balance.

10 Claims, No Drawings

BETA-ALUMINA POLYCRYSTALLINE CERAMICS

This invention relates to Beta-alumina polycrystalline ceramics. Such polycrystalline ceramics can, depending upon their composition and method of preparation, either take the form whose basic empirical formula is $NaAl_{11}O_{17}$ or $NaAl_5O_8$ or a form which is an aggregate of the two.

Such polycrystalline ceramics are suitable for use as an electrolyte in apparatus of the kind involving the transport of sodium ions by diffusion through a solid electrolyte, for example in electric cells or batteries of the sodium/sulphur type.

From the work of Thery and Briacon and of Yamaguchi it is known that the layer structure of crystalline Beta-alumina $NaAl_5O_8$ is similar to that of Beta-alumina $NaAl_{11}O_{17}$, but with a lower degree of crystal symmetry. The layer structure of the ceramic is composed of alternate spinel layers or blocks and sodium layers. The spinel layers consist of aluminum and oxygen atoms arranged as in gamma alumina and the sodium layer contains sodium and oxygen atoms. The unit cell of the structure repeats every second layer in $NaAl_{11}O_{17}$ and every third layer in $NaAl_5O_8$.

It has already been proposed to form a Beta-alumina polycrystalline ceramic using the basic constituents $Al_2O_3$, $Na_2O$, $Li_2O$, $MgO$. In the original mix precursors of $Li_2O$ and $MgO$ may be used, for example $LiNO_3$ and $MgCO_3$ which convert to $Li_2O$ and $MgO$ during the formation of the ceramic. The present invention is concerned with Beta-alumina polycrystalline ceramics formed from these four constituents, the object of the invention being to produce a Beta-alumina which is more stable than hitherto in atmospheric conditions without detriment to the other properties required for its use as an electrolyte.

In research leading to this invention it has been discovered that providing that the composition is within defined limits a Beta-alumina consisting of between 90 and 100 percent $NaAl_5O_8$ type is produced and that such a Beta-alumina as compared with known Beta-alumina even of the basic $NaAl_5O_8$ form is stable in atmospheric conditions and has the high conductivity of sodium ions associated with $NaAl_5O_8$ as compared with $NaAl_{11}O_{17}$.

According to this invention a method of preparing a Beta-alumina polycrystalline ceramic comprises firing a mix consisting essentially of:

$Li_2O$—0.7 - 1.5 weight percent
$Na_2O$—8.3 - 8.9 weight percent
$MgO$—0.5 - 2.0 weight percent
$Al_2O_3$—balance Preferably the ratio of $Li_2O$ to $MgO$ is in the range 1:1 to 1:1.5.

The invention will now be further described by way of example.

An intimate mix was prepared from the following constituents in dried form:

$Na_2O$ (as NaOH)—8.3 weight percent
$MgO$ (as $MgCO_3$)—1.0 weight percent
$LiO$ (as LiOH)—0.9 weight percent
$Al_2O_3$— remainder The mix, which had a particle size 40 to 80 percent finer than 200 mesh (British Standard), was isostatically pressed at 40,00 p.s.i. into discs of 4 cms diameter and 3 mm thickness and the discs were fired to the different temperatures set out in the table below, the firing time being held at the specified firing temperature for 1 hour after an approach time to the specified firing temperature of about 18 hours. For firing the discs were surrounded by unfired powder of the same composition as the discs contained in an impermeable magnesia tube.

After firing an X-ray analysis technique was used to determine the relative proportions of $NaAl_5O_8$ and $NaAl_{11}O_{17}$ types of Beta-alumina the results of which are set out in the table below:

TABLE 1

| Firing Temperature °C | Weight percent $NaAl_5O_8$ |
|---|---|
| 1500 | 92.0 |
| 1550 | 94 |
| 1580 | 100 |
| 1600 | 100 |
| 1630 | 100 |

From this table it can be clearly seen that the type $NaAl_5O_8$ Beta-alumina content can be maintained at between 90 and 100 percent over a wide range of firing temperatures.

The resistivity and density of the sample discs prepared as above and fired at 1,580° C were measured and the following results obtained:

density—3.04 gms/cm$^2$
resistivity—1.60 ohm cms at 350° C

The fracture strength of these latter samples was measured at time intervals after storage in an atmosphere of 100 percent humidity. The following results were obtained.

Initial fracture strength — 13,000 p.s.i.
After 1 week — 13,000 p.s.i.

For comparison with the composition of the above example, sample Beta-alumina discs were prepared as above having the same MgO content but the $Li_2O$ contents of 0.5 weight percent and 1.8 weight percent which are outside the range of the present invention. Using the same X-ray technique the relative proportions of $NaAl_5O_8$ to $NaAl_{11}O_{17}$ types of Beta-alumina were as given in Table 2 below.

TABLE 2

| Percent $Li_2O$ | Firing Temperature | Percent $NaAl_5O_8$ |
|---|---|---|
| 0.5 | 1550 | 62 |
|  | 1600 | 62 |
|  | 1630 | 79 |
| 1.8 | 1500 | 35 |
|  | 1550 | 50 |
|  | 1580 | 40 |

The fracture strength of the Beta-alumina having the 0.5% $Li_2O$ content was measured in an atmosphere of 100% humidity and the following results obtained.

Initial fracture strength—16,00 p.s.i.
After 24 hours—1,000 p.s.i.

It can be seen from these fracture tests that an $Li_2O$ content within the range in accordance with the invention produces a stable Beta-alumina, whereas those outside the range are unstable.

We claim:
1. A method of preparing a Beta-alumina polycrystalline ceramic wherein the type $NaAl_5O_8$ Beta-alumina content is between 90 and 100 percent comprising firing at a temperature from about 1,500°C to about 1,630° C a mix consisting essentially of by weight:
   $Li_2O$ — 0.7 – 1.5 percent
   $Na_2$ — 8.3–8.9 percent
   $MgO$ — 0.5 – 2.0 percent
   $Al_2O_3$ — balance.

2. A method as claimed in claim 1, wherein the ratio of $Li_2O$ to $MgO$ is in the range 1:1 to 1:1.5.

3. A method as claimed in claim 1, wherein the $Li_2O$ content is 0.9 percent by weight.

4. A method as claimed in claim 1, wherein the $MgO$ content is 1.0% by weight.

5. A Beta-alumina polycrystalline ceramic wherein the type $NaAl_5O_8$ Beta-alumina content is between 90 and 100 percent prepared by a method comprising firing at a temperature from about 1,500° C to about 1,630° C a mix consisting essentially of by weight:
   $Li_2O$ — 0.7 – 1.5 percent
   $Na_2$ — 8.3 –8.9 percent
   $MgO$ — 0.5 – 2.0 percent
   $Al_2O_3$ — balance.

6. The method of claim 1 wherein a precursor of $Li_2O$ is employed.

7. The method of claim 6 wherein said precursor is $LiNO_3$.

8. The method of claim 1 wherein a precursor of $MgO$ is employed.

9. The method of claim 8 wherein said precursor is $MgCO_3$.

10. The ceramic of claim 5 wherein the ratio of $Li_2O$ to $MgO$ is from 1:1 to 1:1.5.

* * * * *